(12) United States Patent
Audibert et al.

(10) Patent No.: US 6,644,727 B2
(45) Date of Patent: Nov. 11, 2003

(54) INNER SHELL FOR A ROOF MODULE IN SANDWICH CONSTRUCTION AS WELL AS METHOD OF PRODUCING SAME

(75) Inventors: Bernard Audibert, Frankfurt (DE); Daniel Hock, Johannesberg (DE)

(73) Assignee: ArvinMeritor GmbH (DE)

( * ) Notice: Subject to any disclaimer, the term of this patent is extended or adjusted under 35 U.S.C. 154(b) by 0 days.

(21) Appl. No.: 10/224,756

(22) Filed: Aug. 21, 2002

(65) Prior Publication Data

US 2003/0038511 A1 Feb. 27, 2003

(30) Foreign Application Priority Data

Aug. 23, 2001 (DE) .......................................... 101 41 243

(51) Int. Cl.[7] .............................................. B62D 25/06
(52) U.S. Cl. ...................... 296/210; 296/217; 296/39.1
(58) Field of Search ................................ 296/210, 214, 296/39.1

(56) References Cited

U.S. PATENT DOCUMENTS

| 4,070,055 | A | * | 1/1978 | Fleisch |
| 4,150,186 | A | * | 4/1979 | Kazama |
| 4,610,478 | A | * | 9/1986 | Tervol ........................ 296/214 |
| 4,741,945 | A | * | 5/1988 | Brant et al. .................. 296/214 |
| 4,840,832 | A | * | 6/1989 | Weinle et al. ............... 296/214 |
| 4,886,696 | A | * | 12/1989 | Bainbridge .................. 296/214 |
| 4,957,797 | A | * | 9/1990 | Maeda et al. ................ 296/214 |
| 5,002,334 | A | * | 3/1991 | Meiler et al. ............... 296/214 |
| 5,007,976 | A | * | 4/1991 | Satterfield et al. .......... 296/214 |
| 5,089,328 | A | * | 2/1992 | Doerer et al. ............... 296/214 |
| 5,120,593 | A | * | 6/1992 | Kuihara ....................... 296/214 |
| 5,509,247 | A | * | 4/1996 | Fortez et al. ................ 296/214 |
| 5,845,458 | A | * | 12/1998 | Patel ........................... 296/214 |
| 6,247,745 | B1 | * | 6/2001 | Carroll, III et al. ......... 296/39.1 |
| 6,378,936 | B1 | * | 4/2002 | Grimm et al. ............... 296/214 |

FOREIGN PATENT DOCUMENTS

| JP | 01141140 | 6/1989 |
| JP | 07052724 | 2/1995 |
| WO | WO 01/40025 | 6/2001 |

* cited by examiner

*Primary Examiner*—Joseph D. Pape
*Assistant Examiner*—H. Gutman
(74) *Attorney, Agent, or Firm*—Carlson, Gaskey & Olds

(57) ABSTRACT

An inner shell for a roof module in sandwich construction comprises an inner layer and a holding layer in which a reinforcement layer is embedded. The reinforcement layer is arranged within the holding layer at a side thereof which faces the inner layer. The holding layer is provided with pocket-like recesses on its side facing away from the inner layer which extend as far as to the reinforcement layer.

11 Claims, 2 Drawing Sheets

INNER SHELL FOR A ROOF MODULE IN SANDWICH CONSTRUCTION AS WELL AS METHOD OF PRODUCING SAME

This application claims priority to German patent application number 101 41 243.6 filed Aug. 23, 2001.

BACKGROUND OF THE INVENTION

This invention relates to an inner shell for a roof module in sandwich construction, comprising an inner layer and a holding layer in which a reinforcement layer is embedded, the reinforcement layer being arranged within the holding layer at a side thereof which faces the inner layer.

Such an inner shell is provided for being connected with an outer shell in order to form a roof module in sandwich construction. In this arrangement, the holding layer, with its side facing away from the inner layer, is connected with the outer shell by means of gluing, clipping on or by other measures. As the reinforcement layer is arranged within the holding layer at the side thereof which faces the inner layer, there will be a maximum distance between the neutral line, in case of bending loads, of the roof module and the reinforcement layer; thus, the reinforcement layer offers the highest possible contribution to the strength of the roof module.

Hitherto, a so-called spacer has been incorporated in the foam of the holding layer, which spacer has ensured that the reinforcement layer is located during foaming on the side of the holding layer facing the inner layer. A coarsely porous spacer mat could be used as spacer. The spacer mat, however, is a costly component.

The object of the invention therefore consists in providing an inner shell of the type initially mentioned, which with small piece cost comprises a reinforcement mat that is precisely positioned in the holding layer. It is further the object of the invention to provide a method of producing such inner shell.

SUMMARY OF THE INVENTION

According to the invention, an inner shell for a roof module in sandwich construction comprises an inner layer and a holding layer in which a reinforcement layer is embedded. The reinforcement layer is arranged within the holding layer at a side thereof which faces the inner layer. The holding layer is provided with pocket-like recesses on its side facing away from the inner layer which extend as far as to the reinforcement layer. The pocket-like recesses are the consequence of the method employed for producing the inner shell. With this method, a foaming mold is made available which on one side is provided with nub-like projections. An inner layer is laid into the open foaming mold and a reinforcement layer is placed on the inner layer. An expandable material is then applied onto the reinforcement layer, such material being capable of forming a holding layer in the cured state. Next, the foaming mold is closed so that the projections rest at the reinforcement layer and hold it against the inner layer, and the expandable material is cured so that the reinforcement layer adjoining the inner layer is embedded into the holding layer during foaming. Positioning the reinforcement layer in the holding layer is thus not obtained any longer by a component which is embedded into each inner shell during foaming, but through the design of the foaming mold that is used for the foaming operation. In adaptation to the respective demands, the size of the recesses produced in the holding layer and of the protrusions provided in the foaming mold, respectively, can be used as a trade-off between numerous parameters which are contrary in part. The lower limit for the portion of protrusions of the entire surface area is predefined by the flexibility of the reinforcement layer; i.e., the recesses have to be arranged so close to each other that the reinforcement layer can not go away from the inner layer also in the intermediate regions where it is not pressed—in the foaming mold—against the inner layer by the protrusions. The upper limit for the portion of recesses of the entire surface area is predefined by the required minimum strength of the holding layer as well as by the surface area, made available by it, for being glued together with the outer shell; the webs remaining between the recesses must have specific minimum cross-sections and a specific minimum surface area. The size of the recesses has still further effects. The recesses form hollow chambers in the roof module which are of advantage in terms of acoustic properties. These effects can be optimized by the design of the recesses. In addition, the volume of the holding layer is reduced due to these recesses, so that a smaller amount of expandable material has to be introduced during production. Costs are further reduced thereby. As long as the inner and outer shells are not glued together, the recesses in the holding layer also reduce the strength of the inner shell, so that the latter can be folded more easily. Finally, the recesses reduce that surface area of the holding layer that is glued to the outer shell. Thereby, the separability of inner and outer shells is facilitated during recycling. Size and number of the recesses may differ from each other in distinct regions of the roof module, in order to make use of differing properties in these regions.

Advantageous designs of the invention will be apparent from the subclaims.

DETAILED DESCRIPTION OF THE PREFERRED EMBODIMENT

Figure 1:
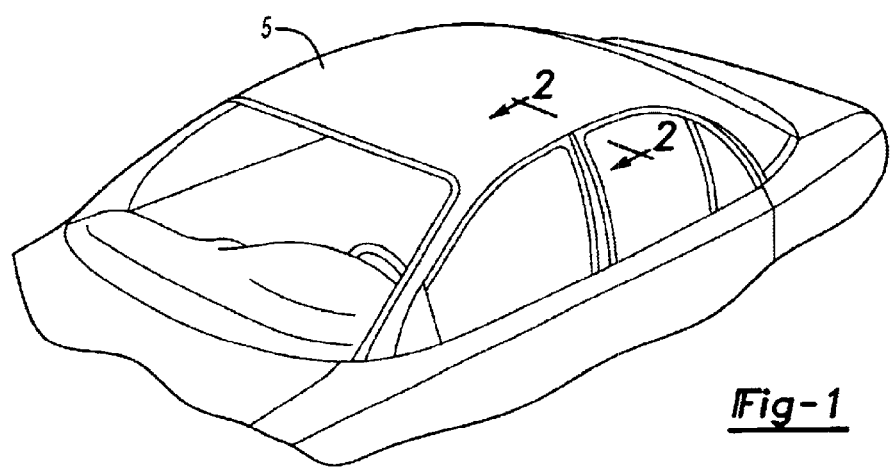
FIG. 1 schematically shows a roof including a roof module configured in sandwich construction.
Figure 2:
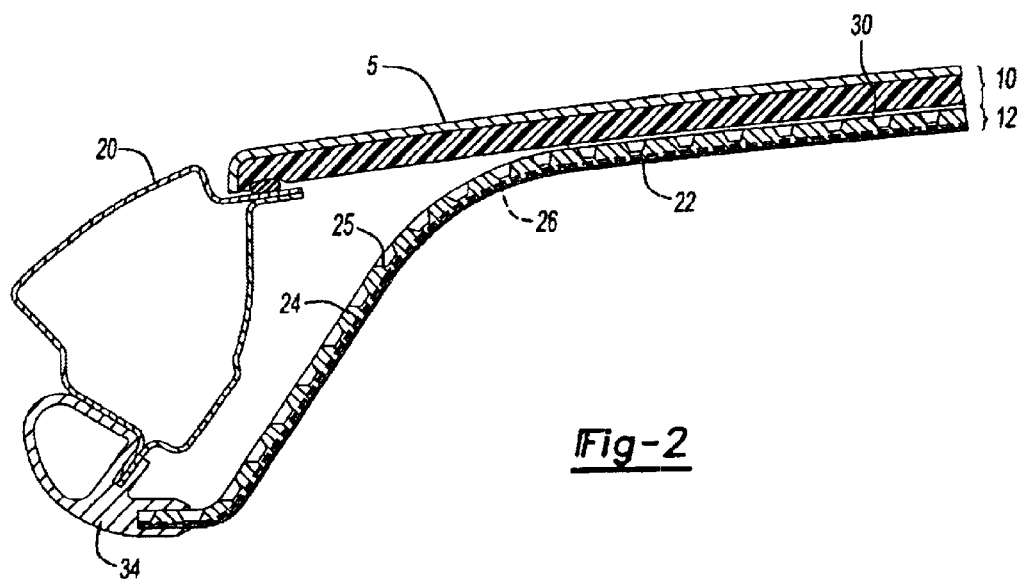
FIG. 2 shows a section along plane II—II of FIG. 1.

In FIG. 1 there is shown schematically a vehicle with a vehicle roof 5 configured in sandwich construction. As can be seen in FIG. 2, the roof module consists of an outer shell 10 and an inner shell 12.

The outer shell essentially consists of an outer skin 14 which may be made of aluminum or plastics, and of a middle layer 16 made of polyurethane. The outer shell 10 is glued together with a longitudinal spar 20 of the vehicle body.

The inner shell 12 is formed essentially by an inner layer 22 and a holding layer 24 in which a reinforcement layer 26 is embedded. The inner layer can be a mat of a pliant plastics which may be provided with a decorative coating. The inner layer may also be formed of a fabric or a knitting, which possibly is provided with a barrier layer of plastics. The barrier layer prevents that the material of the holding layer penetrates the inner layer during foaming. The reinforcement layer 26 may be a mat made of a glass fiber fabric.

Figure 4:
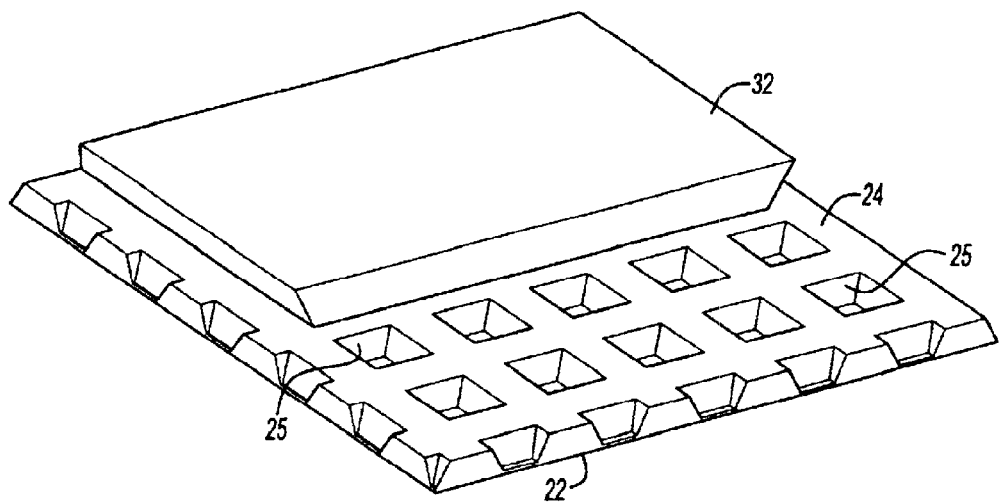
FIG. 4 shows in a schematic, perspective view a foaming mold including a holding layer and an inner layer.

For producing the inner shell 12, the inner layer 22 is laid into a foaming mold. The foaming mold (in FIG. 4 schematically indicated by reference numeral 32) is provided with a plurality of (not shown) nub-like protrusions that have a rectangular basic shape here and taper towards their free end. Taking the foamed product out of the foaming mold is facilitated thereby.

The reinforcement layer 26 is placed on the inner layer 22. A curable, expandable material is applied onto the reinforcement layer 26. Then the foaming mold is closed, so that the protrusions of the foaming mold press the reinforcement layer 26 against the inner layer 22. Subsequently, the expandable material hardens to form the holding layer 24 in which the reinforcement layer 26 is embedded. As a negative shape of the nubs of the foaming mold 32, the holding layer 24 has a plurality of pocket-like recesses 25. At the bottom of the protrusions and when embedded in the holding layer 24, the reinforcement layer 26 is partially exposed.

Figure 3:
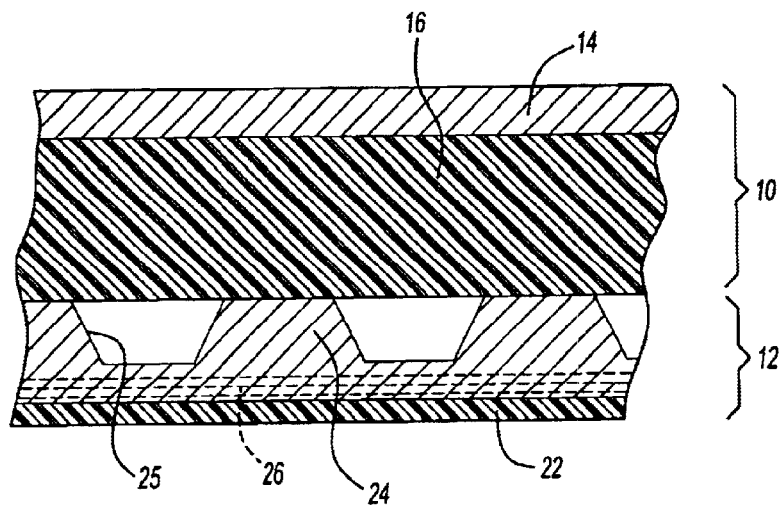
FIG. 3 shows a detail of FIG. 2 on an enlarged scale.

As can be seen in FIGS. 2A and 3, the inner shell 12 and the outer shell 10 are glued together in the middle of the roof module by an adhesive layer 30. This adhesive layer 30 can have any form or structure, such as a liquid glue or a textile adhesive connection (e.g. an eye and hook type fastener, such as VELCRO). As the reinforcement layer 26 is located on the side of the holding layer 24 facing the inner layer 22, it simultaneously is located at a large distance from the neutral line of the sandwich roof module. A high resistance to bending is ensured thereby. Towards the outer rim of the roof, the inner shell 12 is not glued to the outer shell 10, so that it can be guided over the longitudinal spar of the vehicle as far as to a seal 34. The recesses 25 present in the holding layer facilitate bending the inner layer 12.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An inner shell comprising:
   an inner layer and a holding layer; and
   a reinforcement layer embedded in the holding layer,
   wherein said reinforcement layer is arranged within said holding layer at a first side which faces said inner layers, and
   wherein said holding layer has recesses that extend to said reinforcement layer on a second side facing away from said inner layer.

2. The inner shell according to claim 1, wherein said recesses have an essentially rectangular shape.

3. The inner shell according to claim 1, wherein said recesses taper towards said reinforcement layer.

4. The inner shell according to claim 1, wherein a distance between a adjacent recesses is smaller than a width of said recesses.

5. The inner shell according to claim 1, wherein an outer shell is provided which is connected to said holding layer.

6. The inner shell according to claim 5, wherein said holding layer and said outer shell are glued together.

7. The inner shell according to claim 1, wherein said holding layer is connected to said outer shell by an eye and hook fastener.

8. The inner shell according to claim 1, wherein said inner layer is a pliant plastic.

9. The inner shell according to claim 1, wherein said inner layer is a fabric.

10. The inner shell according to claim 1, wherein said reinforcement layer is a glass fiber fabric.

11. An inner shell comprising:
    an inner layer and a holding layer;
    a reinforcement layer embedded in said holding layer and being arranged within said holding layer at a first side which faces said inner layer;
    wherein said holding layer has recesses that extend to said reinforcement layer and that have an essentially rectangular shape on a second side facing away from said inner layer; and
    an outer shell connected to said holding layer.

* * * * *

UNITED STATES PATENT AND TRADEMARK OFFICE
CERTIFICATE OF CORRECTION

PATENT NO.   : 6,644,727 B2
DATED        : November 11, 2003
INVENTOR(S)  : Audibert et al.

It is certified that error appears in the above-identified patent and that said Letters Patent is hereby corrected as shown below:

<u>Column 4,</u>
Line 7, "layers" should be -- layer --
Line 16, delete "a" before "adjacent" and after "between"

Signed and Sealed this

Second Day of March, 2004

JON W. DUDAS
*Acting Director of the United States Patent and Trademark Office*